US011157713B2

(12) United States Patent
Kim et al.

(10) Patent No.: US 11,157,713 B2
(45) Date of Patent: Oct. 26, 2021

(54) ELECTRONIC DEVICE INCLUDING FINGERPRINT RECOGNITION MODULE PROVIDED WITH CONDUCTIVE PATTERN

(71) Applicant: SAMSUNG ELECTRONICS CO., LTD., Suwon-si (KR)

(72) Inventors: Jongdoo Kim, Suwon-si (KR); Jaerok Cho, Suwon-si (KR); Wanjae Ju, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/711,834

(22) Filed: Dec. 12, 2019

(65) Prior Publication Data

US 2020/0193127 A1 Jun. 18, 2020

(30) Foreign Application Priority Data

Dec. 12, 2018 (KR) ........................ 10-2018-0159914

(51) Int. Cl.
*G06K 9/00* (2006.01)
*G06F 3/041* (2006.01)
*G06F 21/32* (2013.01)

(52) U.S. Cl.
CPC ......... *G06K 9/00026* (2013.01); *G06F 3/041* (2013.01); *G06F 21/32* (2013.01); *G06K 9/00053* (2013.01)

(58) Field of Classification Search
CPC ....................................................... G06F 3/044
See application file for complete search history.

(56) References Cited

U.S. PATENT DOCUMENTS 9,589,171 B1 3/2017 Larsson et al.
2003/0072475 A1 4/2003 Tamori
2016/0371691 A1 12/2016 Kang et al.
2017/0125889 A1* 5/2017 Pascolini ............. H04N 5/2253
2017/0300736 A1 10/2017 Song et al.
(Continued)

FOREIGN PATENT DOCUMENTS

KR 101387731 4/2014
KR 10-2016-0053283 5/2016
(Continued)

OTHER PUBLICATIONS

Search Report and Written Opinion dated Jul. 14, 2020 in counterpart European Patent Application No. EP19215710.5.
(Continued)

*Primary Examiner* — Joseph R Haley
(74) *Attorney, Agent, or Firm* — Nixon & Vanderhye P.C.

(57) ABSTRACT

Disclosed is an electronic device. An electronic device according to various embodiments may include: a housing including a front face and a rear face opposite the front face; a transparent plate defining the front face of the housing; a display panel disposed below the transparent plate; a fingerprint sensor disposed between the display panel and the rear face of the housing and configured to acquire biometric information about an external object that is within a specified proximity of the transparent plate; and a conductive pattern disposed adjacent to the fingerprint sensor and configured to detect whether the external object is within a specified proximity of the fingerprint sensor.

19 Claims, 15 Drawing Sheets

(56) References Cited

U.S. PATENT DOCUMENTS

2018/0060632 A1 3/2018 Knabenshue et al.
2018/0211078 A1* 7/2018 Lillie ...................... G06F 3/044
2018/0239941 A1 8/2018 Mackey et al.
2018/0293420 A1 10/2018 Kim et al.
2019/0188445 A1 6/2019 Chi et al.
2019/0265831 A1* 8/2019 Sinnott .............. G06K 9/00013
2019/0354226 A1 11/2019 Choi et al.

FOREIGN PATENT DOCUMENTS

KR 10-2018-0003904 1/2018
KR 10-2018-0024678 3/2018
WO 2018/143673 8/2018

OTHER PUBLICATIONS

International Search Report and Written Opinion dated Apr. 8, 2020 in counterpart International Patent Application No. PCT/KR2019/017549.
Partial European Search Report dated Apr. 3, 2020 in counterpart International Patent Application No. EP19215710.5.

* cited by examiner

ELECTRONIC DEVICE INCLUDING FINGERPRINT RECOGNITION MODULE PROVIDED WITH CONDUCTIVE PATTERN

CROSS-REFERENCE TO RELATED APPLICATION

This application is based on and claims priority under 35 U.S.C. § 119 to Korean Patent Application No. 10-2018-0159914, filed on Dec. 12, 2018, in the Korean Intellectual Property Office, the disclosure of which is incorporated by reference herein in its entirety.

BACKGROUND

1) Field

The disclosure relates to an electronic device including a fingerprint recognition module provided with a conductive pattern.

2) Description of Related Art

An electronic device, which is versatile, may store various types of personal information, and may have an authentication function using biometric information such as a fingerprint or an iris of a user as a means for financial transactions or personal authentication. The importance of authentication services is increasing for the protection of personal information when using financial transactions or authentication services. As the fingerprint sensor, at least one of a capacitive fingerprint sensor, a pressure-sensitive fingerprint sensor, an optical fingerprint sensor, or an ultrasonic fingerprint sensor may be used. A conventional fingerprint sensor is disposed in an area exposed to the exterior of an electronic device, a button or an area of a housing to receive a user's fingerprint, and input from the button or one area of the rear housing may be unintuitive or may cause inconvenience to the user. Display areas of electronic devices are increasing in size, and for this purpose, the adoption of in-display fingerprint sensors that are capable of being recognized in front display areas is increasing.

An electronic device may include a fingerprint sensor in an active area of a display thereof. Accordingly, the fingerprint sensor may be disposed below the front cover and the display panel of the electronic device. When the fingerprint sensor and the touch screen panel (TSP) are constantly activated, the amount of power consumed by the electronic device may increase. An electronic device according to various embodiments normally maintains the touch panel and the fingerprint sensor in an inactive state so as to minimize power consumption.

The above information is presented as background information only to assist with an understanding of the disclosure. No determination has been made, and no assertion is made, as to whether any of the above might be applicable as prior art with regard to the disclosure.

SUMMARY

According to embodiments of the disclosure, an electronic device according to various example embodiments may include: a housing including a front face and a rear face opposite the front face; a transparent plate defining the front face of the housing; a display panel disposed below the transparent plate; a fingerprint sensor disposed between the display panel and the rear face of the housing and configured to acquire biometric information about an external object within a specified proximity to the transparent plate; and a conductive pattern disposed adjacent to the fingerprint sensor and configured to detect whether the external object is within the specified proximity.

An electronic device according to various example embodiments may include: a housing including a front face and a rear face opposite the front face; a transparent plate having a first face defining the front face of the housing; a display panel including a touch panel and a plurality of pixels configured emit light towards the transparent plate, the display panel having a first face in contact with a second face of the transparent plate; a fingerprint sensor in contact with a second face of the display panel and configured to acquire biometric information about an external object within a specified proximity to the transparent plate; a flexible printed circuit board on which the fingerprint sensor is disposed; and a conductive pattern disposed on the flexible printed circuit board substantially surrounding the fingerprint sensor and configured to detect whether the external object approaches.

With an electronic device according to various example embodiments, the touch panel and the fingerprint sensor are activated when a user's finger approaches an area in which a fingerprint sensor is disposed, making it possible to minimize and/or reduce power consumption.

With an electronic device according to various example embodiments, instead of implementing an always-on-display (AOD), it is possible to activate the fingerprint recognition icon via the display based on a user's finger being located within a specified vicinity of the fingerprint sensor. Thus, it is possible to reduce the number of electronic components for implementing the AOD, and thus it is possible to reduce manufacturing costs.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
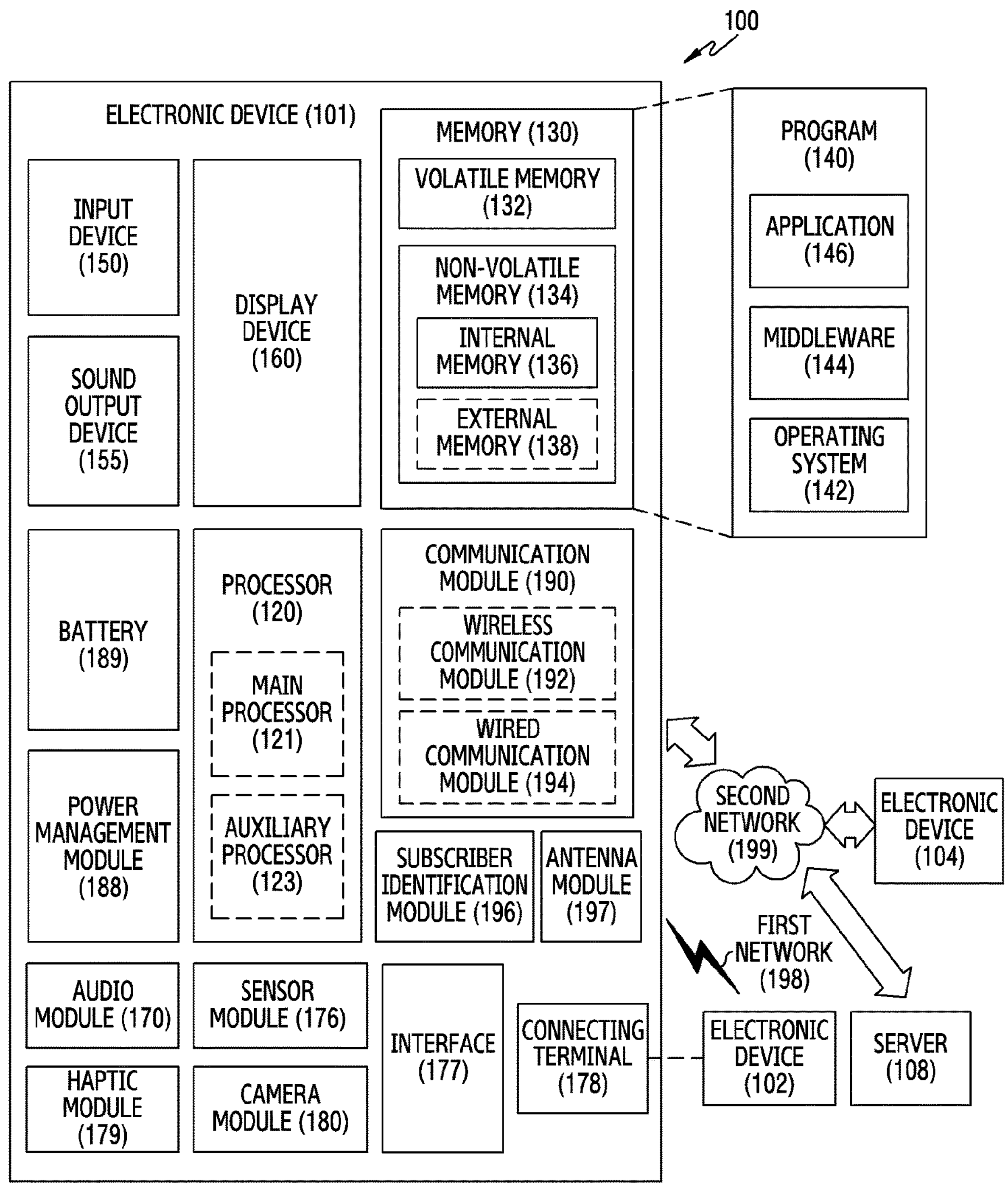
FIG. 1 is a block diagram illustrating an example electronic device in a network environment according to an embodiment.

FIG. 1 is a block diagram illustrating an example electronic device in a network environment according to an exemplary embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
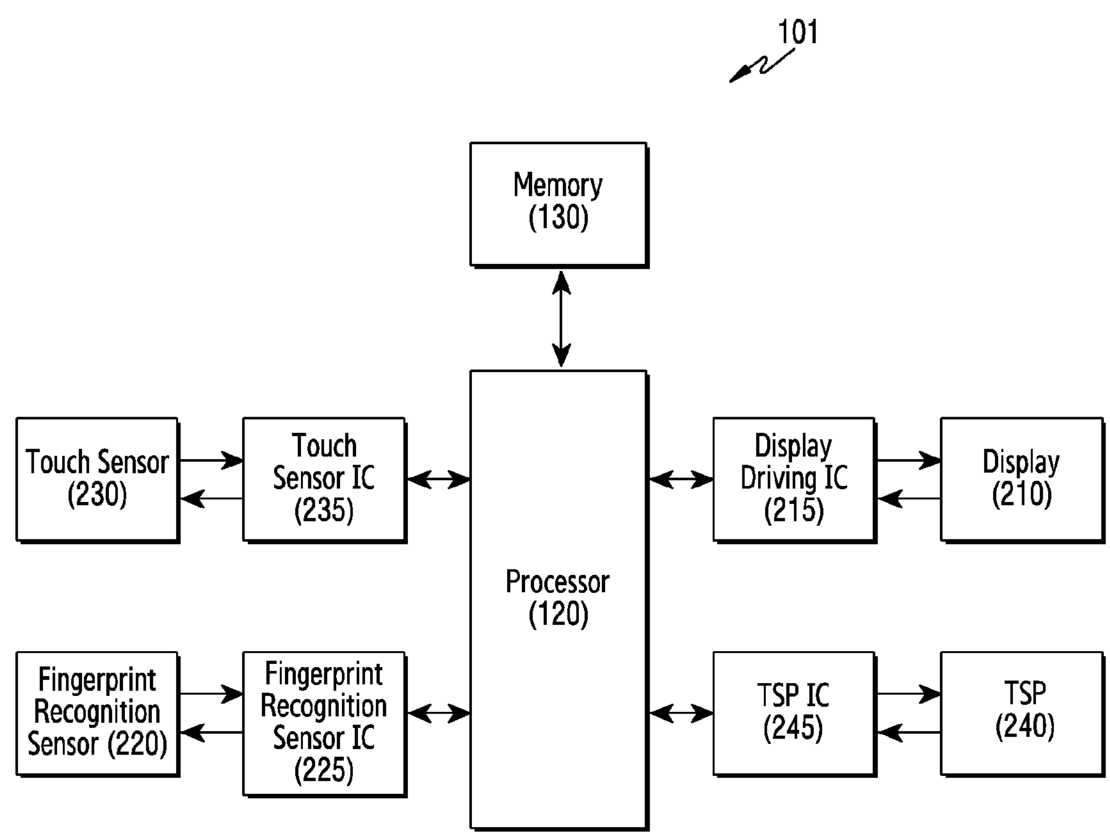
FIG. 2 is a block diagram illustrating an example electronic device including a recognition sensor according to an embodiment.

FIG. 2 is a block diagram illustrating an example electronic device including a recognition sensor according to an embodiment.

Referring to FIG. 2, an electronic device 101 may include a display 210, a display-driving IC (DDI) 215 configured to control the display 210, a fingerprint recognition sensor 220, a fingerprint recognition sensor IC 225 configured to control the fingerprint recognition sensor 220, a touch sensor 230, a touch sensor IC 235 configured to control the touch sensor 230, a touch screen panel (TSP) 240, and a touch screen panel IC 245 configured to control the touch screen panel 240. The display 210 may include pixels configured to emit light, and each of the pixels may emit light to transmit a content to the outside of the electronic device 101. The DDI 215 may receive, from a processor (e.g., including processing circuitry) 120, image data, or image information including an image control signal corresponding to a command for controlling the image data. At least some pixels of the display 210 may be driven based on a voltage value or a current value capable of driving the pixels to display information corresponding to the image data on the display 210.

According to an embodiment, the fingerprint recognition sensor 220 may be disposed below the display 210, and may not be exposed to the outside. The fingerprint recognition sensor 220 may obtain biometric information, such as a fingerprint of an external object (e.g., a user's finger). The fingerprint recognition sensor 220 may, for example, and without limitation, include at least one of an optical fingerprint sensor, a capacitive fingerprint sensor, an ultrasonic fingerprint sensor, a pressure-sensitive fingerprint sensor, or the like. The fingerprint recognition sensor 220 may transmit biometric information obtained from the user to the processor 120 via the fingerprint recognition sensor IC 225. The fingerprint recognition sensor IC 225 may receive a fingerprint recognition sensor activation or driving signal from the processor, and may control the fingerprint recognition sensor 220.

According to an embodiment, the touch sensor IC 235 may detect a touch input and/or a hovering input of the external object that is close (e.g., within a specified proximity, vicinity or distance) to the touch sensor 230 while transmitting/receiving a signal to/from the touch sensor 230. The touch sensor IC 235 may be disposed as part of the display-driving IC 215 or the display 210, and may be part of another component. The touch sensor 230 may include a conductive pattern, and may be disposed around (e.g., substantially surrounding) the fingerprint recognition sensor 220 to sense the approach of the external object that is close to the fingerprint recognition sensor 220. The touch sensor IC 235 may transmit a signal in response to the approach of the external object, detected by the touch sensor 230, to the processor 120.

The touch screen panel IC 245 may control the touch screen panel (TSP) 240 to detect a touch input and/or a hovering input for a specific position by measuring, for example, a change in a signal (e.g., a voltage, a light amount, a resistance, a charge amount, etc.) for a specific position of the display 210, and may provide information regarding the detected touch input and/or hovering input (e.g., a position, an area, a pressure, a time, etc.) to the processor 120. According to an embodiment, the touch screen panel IC 245 may be included as a part of the display-driving IC 215 or the display 210, or a part of another component (e.g., an auxiliary processor 123).

According to an embodiment, the processor 120 may include various processing circuitry and receive information detected by the fingerprint recognition sensor 220, the touch sensor 230, and the touch screen panel 240, and may control the display 210, the fingerprint recognition sensor 220, the touch sensor 230, and the touch screen panel 240 based on the signals transmitted from each of the sensors and other devices. The memory 130 may store information transmitted from the fingerprint recognition sensor 220, the touch sensor 230, and the touch screen panel 240, and may retransmit the stored information to the processor 120. The memory 130 may store information to be displayed on the display 210. According to an embodiment, when an external object, e.g., the user's finger, is detected by the touch sensor 230, an icon (e.g., a fingerprint recognition icon) to be displayed on the display 210 may be included. The memory 130 may transmit/receive a signal to/from the processor 120, and may directly transmit/receive a signal to/from the display-driving IC 215, the fingerprint recognition sensor IC 225, the touch sensor IC 235, and the touch screen panel IC 245.

Figure 3:
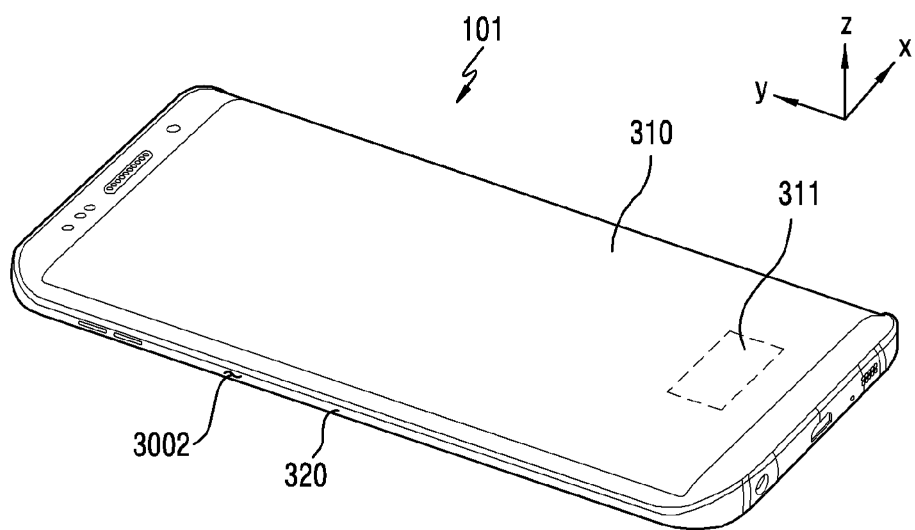
FIG. 3 is a perspective view illustrating an example electronic device according to an embodiment.

FIG. 3 is a perspective view illustrating an example electronic device according to an embodiment.

Referring to FIG. 3, the electronic device 101 may include a front plate 310 and a housing 320. The housing 320 may provide the external appearance of the electronic device. The front face of the housing 320 may be formed as the front plate 310. The housing 320 may include a rear face opposite the front plate 310, and may have a side face 3002 disposed between the front and rear faces. The front plate 310 may be defined as the front face of the housing, the rear face of the housing 320 may be formed as a rear housing, and the side face 3002 of the housing 320 may be formed as a side housing. The side housing and the rear housing may be formed separately, or the side housing and the rear housing may be integrally formed. In the housing 320, the front and rear faces are spaced apart from each other and face each other with respect to the z-axis, and the side face 3002 formed by the side housing surrounds a space formed between the front and rear faces of the housing 320.

According to an embodiment, each of the housings may comprise the front face, the rear face, or the side face 3002, independently or at least partially in conjunction with each other. For example, when the front housing or the rear housing is formed in a curved shape, it may form a part of the side face 3002. The side housing may extend integrally from an end of the side face 3002 substantially parallel to the front plate 310 so as to form the rear face of the housing.

According to an embodiment, the front plate 310 may be formed to be transparent, and the light or signals, expressed by the display device disposed therein, may pass through the front plate 310. At least a portion of the front plate 310 may be defined as a fingerprint detection area. A fingerprint recognition sensor may be disposed below the fingerprint detection area 311. The user may interact with the front plate 310 via a touch panel and a touch sensor included in the electronic device 101. For example, the electronic device 101 may sense various inputs, such as a user's touch input to the front plate 310 or writing, drawing using a stylus, or the like, using, for example, an electromagnetic radiation (EMR) phenomenon. According to various embodiments, the electronic device 101 may detect a hovering input approaching the fingerprint detection area 311 of the front plate 310 via a touch sensor, and a fingerprint recognition icon displayed in the fingerprint detection area 311 of the display may be recognized through the front plate 310.

According to an embodiment, the fingerprint detection area 311 may, for example, and without limitation, be disposed on the central axis parallel to the y-axis of the electronic device 101. In order to increase the convenience of the user, the fingerprint detection area 311 may be disposed in the lower area of the front plate 310. The lower area may be a portion of the front plate 310 that is located away from the area in which various sensors (e.g., an infrared sensor, a proximity sensor, or a camera) are located with respect to the y-axis. The fingerprint detection area 311 is not limited thereto, and may be formed in at least a portion of the front plate 310 at any of various positions thereof. A fingerprint sensor may be disposed inside the electronic device 101 below the fingerprint detection area 311 (e.g., in the -z-axis direction), and the fingerprint sensor may detect the user's fingerprint.

Figure 4:
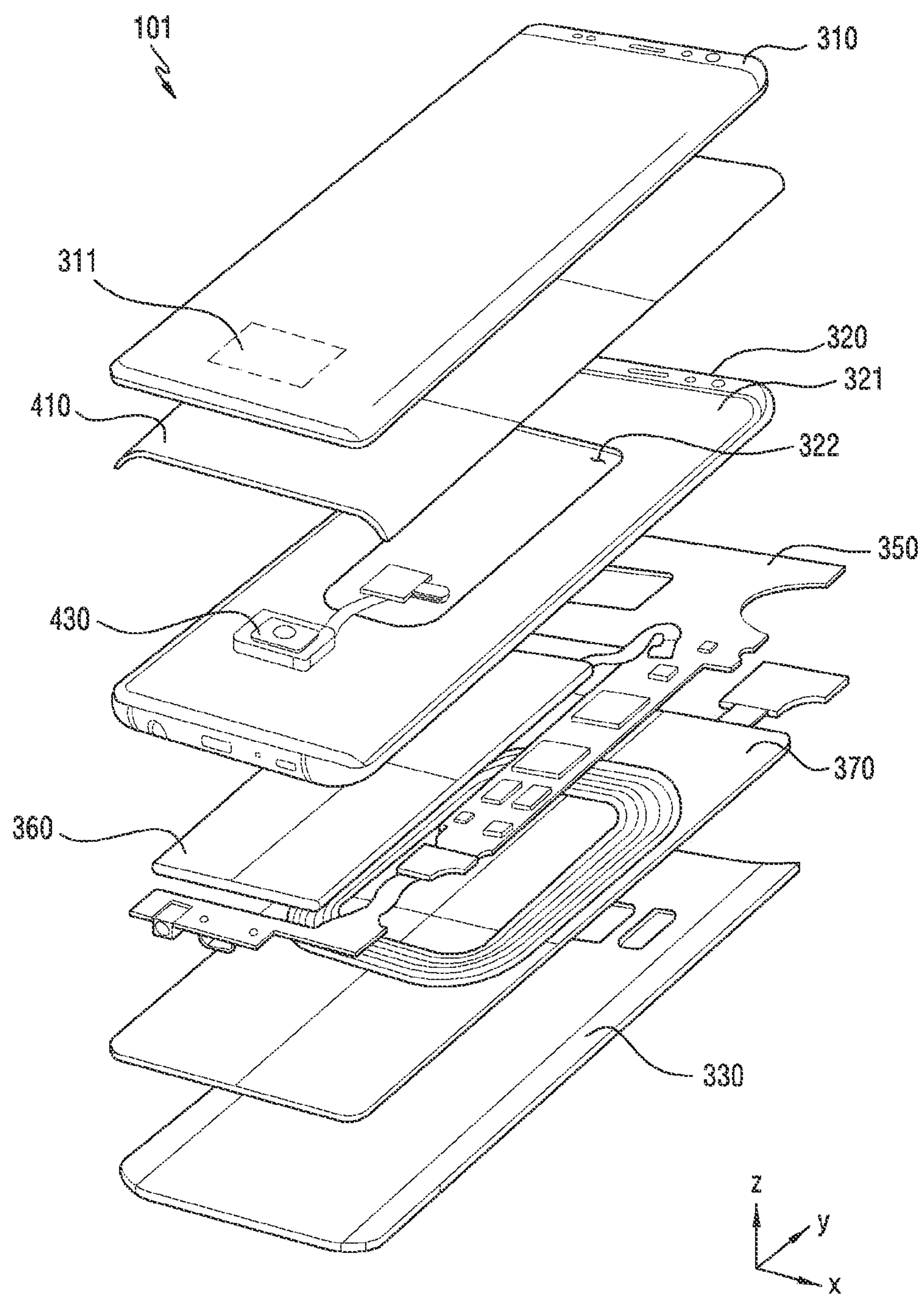
FIG. 4 is an exploded perspective view illustrating an example electronic device according to an embodiment.

FIG. 4 is an exploded perspective view illustrating an example electronic device according to an embodiment.

Referring to FIG. 4, the electronic device 101 may include a front housing 310 (or a transparent member), a side housing 320, a rear housing 330, a printed circuit board 350, a battery 360 (e.g., the battery 189 in FIG. 1), and an antenna 370 (e.g., the antenna module 197 of FIG. 1). At least one of the components of the electronic device 101 may be the same as or similar to at least one of the components of the electronic device 101 of FIG. 1, and a redundant description thereof may not be repeated here.

The electronic device 101 may include a plurality of panels interposed between the front housing 310 and the rear housing 330. According to an embodiment, the plurality of panels may include a display panel 410 and a fingerprint sensor 430. The display panel 410 may be stacked or attached below the front housing 310. In some embodiments, a polarization layer may be interposed between the front housing 310 and the display panel 410. The polarization layer may further include an electrode pattern formed on one face thereof in order to detect a touch. In the electronic device 101, a touch panel may be added on the display panel so as to detect a touch of a user or an external object.

According to an embodiment, the fingerprint sensor 430 may be attached to the lower portion of the display panel 410 at a position corresponding to the fingerprint detection area 311 when the front housing 310 is viewed from above (in the -z-axis direction). The fingerprint sensor 430 may be disposed to be offset from the center of the electronic device

101 in the -y-axis direction. The fingerprint sensor 430 may be configured to recognize the user's biometric information from the user's touch input and/or hovering input to the fingerprint detection area 311.

The side housing 320 may include a support 321 integrally formed therein or formed by a separate member coupled thereto. The front housing 310 may be coupled to one face of the support 321, and a printed circuit board 350 may be coupled to the rear face of the support 321. A processor (e.g., the processor 120 in FIG. 1), memory (e.g., the memory 130 in FIG. 1), and/or an interface (e.g., the interface 177 in FIG. 1) may be mounted (or disposed) on the printed circuit board 350. The processor may include various processing circuitry, such as, for example, and without limitation, at least one of a central processing unit, an application processor, a graphic processor, an image signal processor, a sensor hub processor, a communication processor, a dedicated processor, or the like. The memory may include, for example, and without limitation, a volatile memory, nonvolatile memory, or the like. The interface may include various circuitry, such as, for example, and without limitation, a high-definition multimedia interface (HDMI), a universal serial bus (USB) interface, an SD card interface, and/or an audio interface, or the like. The interface may electrically or physically connect, for example, the electronic device 101, to an external electronic device, and may include, for example, and without limitation, a USB connector, an SD card/an MMC connector, an audio connector, or the like.

The battery 360 may be a device for supplying power to at least one component of the electronic device 101 and may include, for example, and without limitation, a non-rechargeable primary battery, a rechargeable secondary battery, a fuel cell, or the like. At least a portion of the battery 360 may be disposed to be substantially flush with, for example, the printed circuit board 350. The battery 360 may be integrally disposed within the electronic device 101, or may be disposed to be detachable from the electronic device 101. According to an embodiment, an opening (or a housing slot) 322 may be formed in at least a portion of the support 321. The opening 322 may, for example, be used as a space capable of accommodating the swelling of the battery 360.

The antenna 370 may be disposed between the rear housing 330 and the battery 360. The antenna 370 may include, for example, and without limitation, a near-field communication (NFC) antenna, a wireless charging antenna, and/or a magnetic secure transmission (MST) antenna, or the like. The antenna 370 may perform short-range communication with, for example, an external electronic device, or may transmit/receive power required for charging to/from the external device in a wireless manner. In another embodiment, an antenna radiator may be further included in a portion of the side housing 320 and/or the support 321 to form an antenna structure together with the antenna 370.

Figure 5:
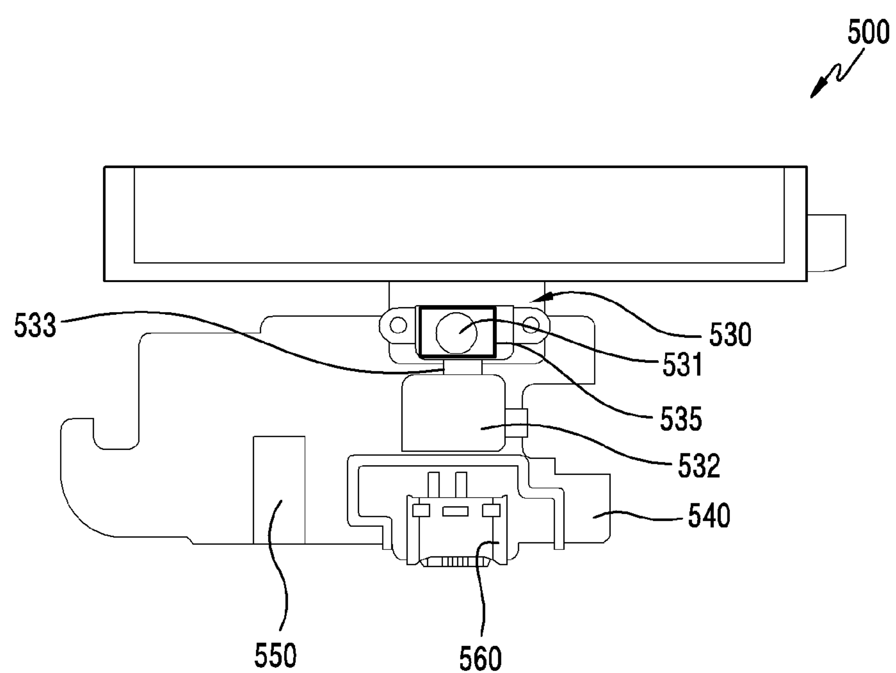
FIG. 5 is a plan view illustrating an example printed circuit board on which a fingerprint sensor module is mounted according to an embodiment.
Figure 6:
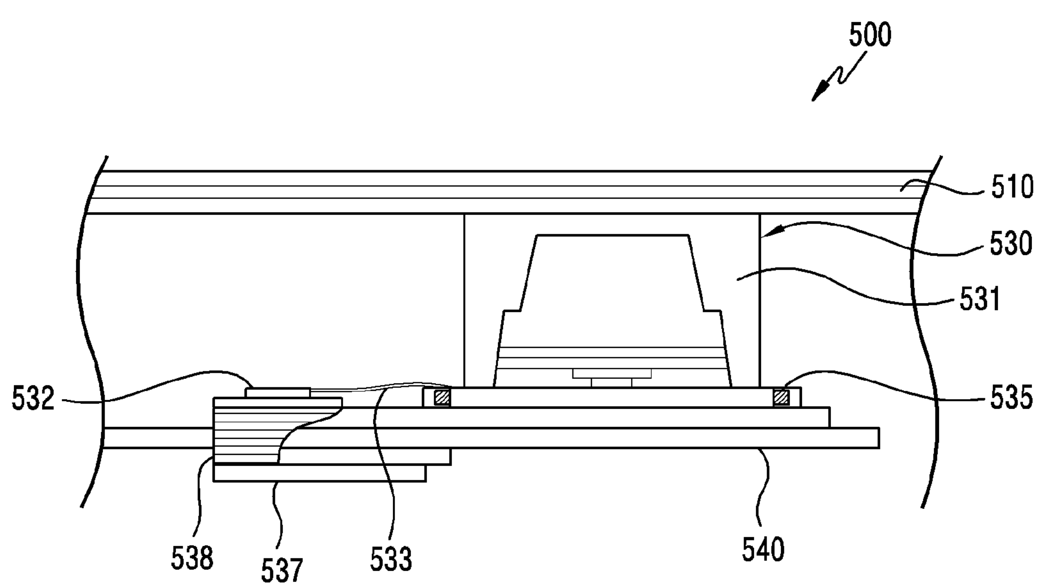
FIG. 6 is a cross-sectional view illustrating an example electronic device including a fingerprint sensor module according to an embodiment.

FIG. 5 is a plan view illustrating an example printed circuit board on which a fingerprint sensor module is mounted according to an embodiment, and FIG. 6 is a cross-sectional view illustrating an example electronic device including a fingerprint sensor module according to an embodiment.

Referring to FIGS. 5 and 6, the electronic device 500 may include a display 510, a fingerprint sensor module (e.g., including a fingerprint sensor) 530, and a printed circuit board 540.

According to an embodiment, the display 510 may include a transparent plate (e.g., the front plate 310 in FIG. 4) and a display panel (e.g., the display panel 410 in FIG. 4). On the front face of the display 510, the transparent plate 310, to which the light emitted from the display panel 410 is transmitted, may be disposed. The fingerprint sensor module 530 may be disposed on the rear face of the display 510.

According to an embodiment, the fingerprint sensor module 530 may include a fingerprint sensor 531 and a fingerprint sensor IC 532. The fingerprint sensor module 530 may be disposed between the printed circuit board 540 and the display 510. The fingerprint sensor module 530 may recognize biometric information of the user who is within a specified proximity to, or in contact with, the transparent front plate 310. The fingerprint sensor module 530 may use, for example, and without limitation, an optical fingerprint sensor, a capacitive fingerprint sensor, an ultrasonic fingerprint sensor 531, or the like, in order to detect an external object that is close (e.g., within a specified proximity, vicinity, distance, etc.) to the front plate 310. According to an embodiment, the fingerprint sensor 531 may, for example, and without limitation, include an optical module, or may include an ultrasonic transmitter and an ultrasonic receiver. When using the optical fingerprint sensor, the fingerprint sensor 531 may acquire an image of a fingerprint using an optical sensor such as, for example, and without limitation, a CCD/CMOS, a photodiode, or the like. When using the ultrasonic fingerprint sensor, the fingerprint sensor 531 may acquire fingerprint information by converting a fingerprint image reflected by an ultrasonic wave into an electrical signal. The fingerprint sensor 531 may transmit the acquired fingerprint image or fingerprint information to the fingerprint sensor IC 532. The fingerprint sensor IC 532 may transmit the biometric information such as the acquired fingerprint image or fingerprint information to a processor mounted on the printed circuit board 540 to perform an authentication operation and/or to control the fingerprint sensor 531.

According to an embodiment, a conductive pattern 535 (e.g., including a pattern of conductive material that may be disposed in various configurations, including, for example, one or more lines of conductive material) may be disposed to surround or substantially surround the fingerprint sensor 531. The conductive pattern 535 may be used as a touch sensor (e.g., the touch sensor 230 in FIG. 2). The conductive pattern 535 may detect an external object (e.g., the user's finger) approaching the fingerprint detection area (e.g., the fingerprint detection area 311 in FIG. 3). The conductive pattern 535 may detect touch and/or hovering of the external object based on a change in a signal (e.g., a voltage, a light amount, a resistance, a charge amount, etc.) with respect to the conductive pattern 535 when the external object approaches the fingerprint detection area 311.

According to an embodiment, the fingerprint sensor 531, the fingerprint sensor IC 532, and the conductive pattern 535, which are components of the fingerprint sensor module 530, may be connected to a flexible printed circuit board (FPCB) to be connected to the printed circuit board 540. The fingerprint sensor 531 and the fingerprint sensor IC 532 may be connected to each other via the flexible printed circuit board 533 including a signal line, and the fingerprint sensor IC 532 and the printed circuit board 540 may also be connected to each other via a terminal 537 formed at an end of the flexible printed circuit board 538. The fingerprint sensor module 530 and the processor are electrically connected to each other via the flexible printed circuit board, and thus the processor may receive a signal from the fingerprint sensor module 530, or may control the fingerprint sensor module 530.

According to an embodiment, the printed circuit board 540 may be disposed in the internal space of the electronic device 500. An electronic component for driving the electronic device 500, such as a processor, may be mounted on the printed circuit board 540. A power connector 560 for supplying power to the electronic device and a sound output terminal 550 may be mounted below the printed circuit board 540.

Figure 7:
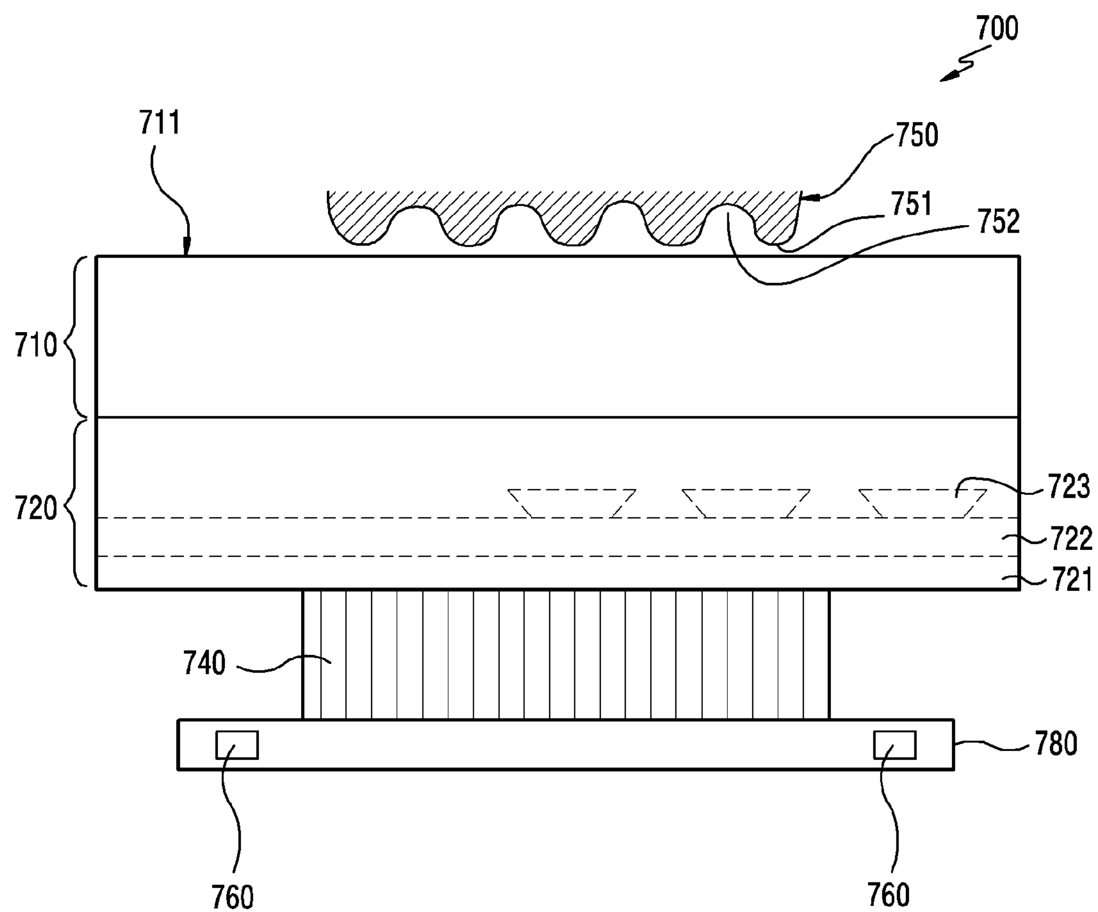
FIG. 7 is a cross-sectional view illustrating an example arrangement of a fingerprint sensor and a conductive pattern according to an embodiment.

FIG. 7 is a cross-sectional view illustrating an example arrangement of an example fingerprint sensor and conductive pattern according to an embodiment.

Referring to FIG. 7, an electronic device 700 may include a display 711, a fingerprint sensor 740, and a conductive pattern 760.

According to an embodiment, a transparent plate 710 (e.g., the front plate 310 in FIG. 4) may transmit at least one kind of light displayed on the display panel 720. The transparent plate 710 may be include, for example, and without limitation, at least one of glass and a polymer material such as, for example, and without limitation, polycarbonate (PC), polymethyl methacrylate (PMMA), polyimide (PI), polyethylene terephthalate (PET), polypropylene terephthalate (PPT), or the like. According to an embodiment, the transparent plate 710 may include a multilayer structure of various materials.

According to an embodiment, the display panel 720 may include a base substrate 721, a thin film transistor (TFT) layer 722 disposed on the base substrate 721, and a pixel layer 723 (or an organic light-emitting layer), to which a signal voltage is applied from the thin film transistor layer 722. The thin film transistor layer 722 may include an active layer, a gate insulating layer, a gate electrode, an interlayer insulating layer, a source electrode, and a drain electrode, and may transmit a signal required for driving the pixel layer 723. The pixel layer 723 may include a plurality of display elements, for example, light-emitting diodes. The pixel layer 723 may be defined as an area in which a plurality of organic display elements formed on the thin film transistor layer 722 are disposed. The display panel 720 may further include any suitable components, such as a thin film encapsulation layer encapsulating the pixel layer 723 and a back film for supporting the base substrate 721.

According to an embodiment, an adhesive member (e.g., a sticker or an adhesive) may be used to mutually attach the transparent plate 710 and the display panel 720 and to mutually attach respective layers included in the transparent plate 710 and the display panel 720. The adhesive member may include, for example, and without limitation, a double-sided adhesive film, a pressure-sensitive adhesive (PSA), an optically clear adhesive (OCA) film, an optically clear adhesive resin (OCR), or the like.

According to an embodiment, a black coating layer may be included such that the inside of the electronic device (e.g., the fingerprint sensor 740) is not visible through the transparent plate 710 and the non-driven transparent display panel 720 when the user views the transparent plate 710.

According to an embodiment, the fingerprint sensor 740 may be disposed below the laminate of the transparent panel 710 and the display panel 720. The fingerprint sensor 740 may be attached to the display panel 720 by an adhesive layer. The adhesive layer may, for example, and without limitation, be an optically clear adhesive (OCA) layer, or the like. The adhesive layer may be formed of a material, in which an image of the external object 750 transferred to the fingerprint sensor 740 or signals used when the fingerprint sensor 740 and the external object interact with each other are not distorted.

According to an embodiment, the fingerprint sensor 740 may be electrically connected to the flexible printed circuit board 780. The face of the fingerprint sensor 740, in which the receiver is oriented, may be disposed adjacent to the display panel 720, and the flexible printed circuit board 780 may be disposed in a direction facing the display panel 720. The flexible printed circuit board 780 may be spaced apart from the display panel 720 by the height of the fingerprint sensor 740. The flexible printed circuit board 780 may include a conductive pattern 760.

According to an embodiment, the conductive pattern 760 may be disposed inside the flexible printed circuit board 780 or on the surface of the flexible printed circuit board 780. The conductive pattern 760 may be disposed inside the flexible printed circuit board 780, or may be printed on the surface of the flexible printed circuit board 780. In the conductive pattern 760, when an external object 750 approaches the fingerprint detection area (e.g., the fingerprint detection area 311 in FIG. 3) of the transparent plate 710, the current or voltage flowing in the conductive pattern 760 may change. In order to increase the sensitivity for detecting an external object approaching the fingerprint detection area 311, the conductive pattern 760 may be disposed close to the display panel 720. In order to reduce the distance between the display panel 720 and the conductive pattern 760, the fingerprint sensor 740 may be disposed to be in contact with the rear face of the display panel 720.

According to an embodiment, in order to increase the efficiency with which an external object 750 approaching the fingerprint detection area (e.g., the fingerprint detection area 311 of FIG. 3) is detected, the conductive pattern 760 may be disposed surrounding and adjacent to the fingerprint sensor 740.

The operation of the fingerprint sensor module of the electronic device 700 according to an embodiment may, for example, be as follows. When an external object 750 such as a finger approaches the fingerprint detection area, a touch and/or hovering of the external object 750 may be detected by measuring a change in a signal such as a voltage or a current in the conductive pattern 760. When detecting the external object 750, the electronic device may activate the fingerprint sensor 740. For example, when an approach or a touch of an external object with respect to the fingerprint detection area may be detected by the conductive pattern 760, the fingerprint sensor 740 may be activated to perform a biometric authentication operation via a touch sensor IC (e.g., the touch sensor IC 235 in FIG. 2) or a processor (e.g., the processor 120 of FIG. 1).

According to an embodiment, when the fingerprint sensor 740 is activated, in order to recognize valleys 752 and peaks 751 of the user's finger fingerprint, the ultrasonic sensor may generate ultrasonic waves towards the transparent plate 710, receive a reflected wavelength, and form an image using electrical pixels. The optical sensor may image the fingerprint detection area of the transparent plate 710 on the fingerprint sensor 740 and may acquire a fingerprint image.

The electronic device 700 may perform a security-related authentication function based on the fingerprint image. For example, the processor may receive an output fingerprint image, or may receive a fingerprint image from a fingerprint sensor 740 processor. The processor may compare the received fingerprint image with a reference image to perform fingerprint authentication. The reference image may be stored in advance by an authenticated user of the electronic device, and may include an image of the fingerprint of the authenticated user, an image registered for setting fingerprint registration, or the like. The reference image may be stored in a secure area of the memory 130 included in the electronic device.

Figure 8:
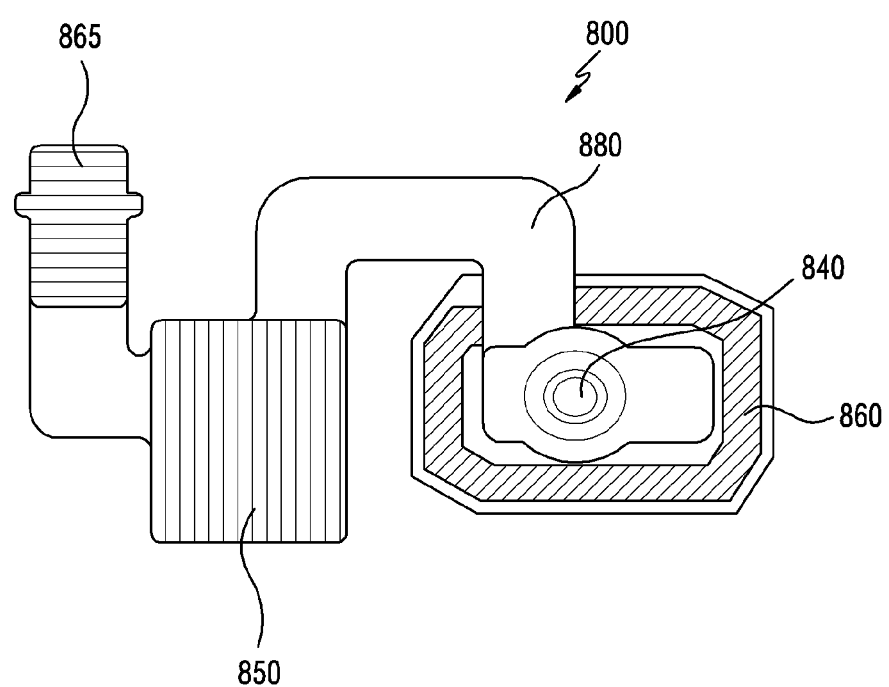
FIG. 8 is a plan view illustrating an example fingerprint sensor module according to an embodiment.

FIG. 8 is a plan view illustrating an example fingerprint sensor module according to an embodiment.

Referring to 8, a fingerprint sensor module 800 may include a fingerprint sensor 840, a conductive pattern (e.g., including a pattern of conductive material) 860, and a flexible printed circuit board 880. The fingerprint sensor 840 may be similar to the fingerprint sensors 530 and 740 of FIGS. 6 and 7. The fingerprint sensor 840 may be mounted on the flexible printed circuit board 880 and may be disposed inside the electronic device to be in contact with the rear face of the display.

According to an embodiment, the flexible printed circuit board 880 may include a portion connected to the fingerprint sensor 840, and may extend from the area connected with the fingerprint sensor 840 to be connected to the fingerprint sensor IC 850. The flexible printed circuit board 880 may extend from the fingerprint sensor IC 850 to be connected to a connector 865. The fingerprint sensor IC 850 may transmit/receive a signal from/to the fingerprint sensor 840 via the flexible printed circuit board 880. The fingerprint sensor IC 850 may control the fingerprint sensor 840 via the flexible printed circuit board 880, and may transmit biometric information such as a fingerprint image or data transmitted from the fingerprint sensor 840 to the processor via the flexible printed circuit board 880. The connector 865 of the flexible printed circuit board 880 may be connected to a main printed circuit board (e.g., the printed circuit board 350 in FIG. 4). The processor mounted on the main printed circuit board and the fingerprint sensor IC 850 may be electrically connected via the connector 865, and the fingerprint sensor 840 and the fingerprint sensor IC 850 may transmit biometric data to the processor via the connector 865.

According to an embodiment, the flexible printed circuit board 880 may be formed of a flexible material, and may be formed as a conductive film pattern such as a copper film on, for example, a polyimide film, but the disclosure is not limited thereto. In the flexible printed circuit board 880, a portion connecting the fingerprint sensor 840, the fingerprint sensor IC 850, and the connector 865 to each other may be bendable or flexible. Thus, the fingerprint sensor 840, the fingerprint sensor IC 850, and the connector 865 may be disposed at respective different heights from the rear face of the display.

According to an embodiment, the flexible printed circuit board 880 may include a conductive pattern 860. The conductive pattern 860 may be disposed along the circumference of the fingerprint sensor 840, and may surround or substantially surround the fingerprint sensor 840. The conductive pattern 860 may be disposed at a position corresponding to the fingerprint detection area (e.g., the fingerprint detection area 311 of FIG. 3), and may detect an external object such as the user's finger approaching the fingerprint detection area 311. When an external object is detected in the fingerprint detection area 311, a signal generated from the conductive pattern 860 may be transmitted to the fingerprint sensor IC 850, the processor, a separately existing touch sensor IC (not illustrated), or the like, via the flexible printed circuit board. Where the fingerprint sensor 840 is in an inactive state, when the external object may be detected as approaching based on the signal of the conductive pattern 860, the fingerprint sensor 840 may be activated. Where the processor is in an inactive state or in a standby state, when the external object approaches the fingerprint detection area, the processor may wake up.

Figure 9A:
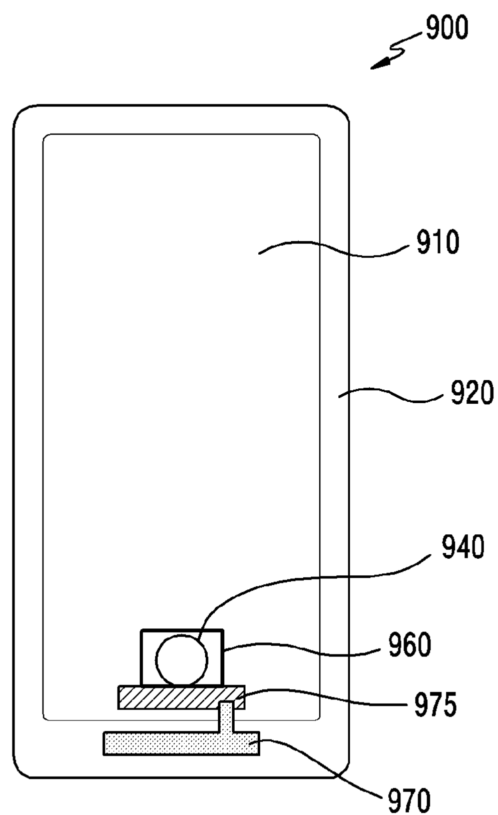
FIG. 9A is a diagram illustrating an example electronic device in which an auxiliary conductive pattern is included in an opaque area located at the lower end of the electronic device according to various embodiments.
Figure 9B:
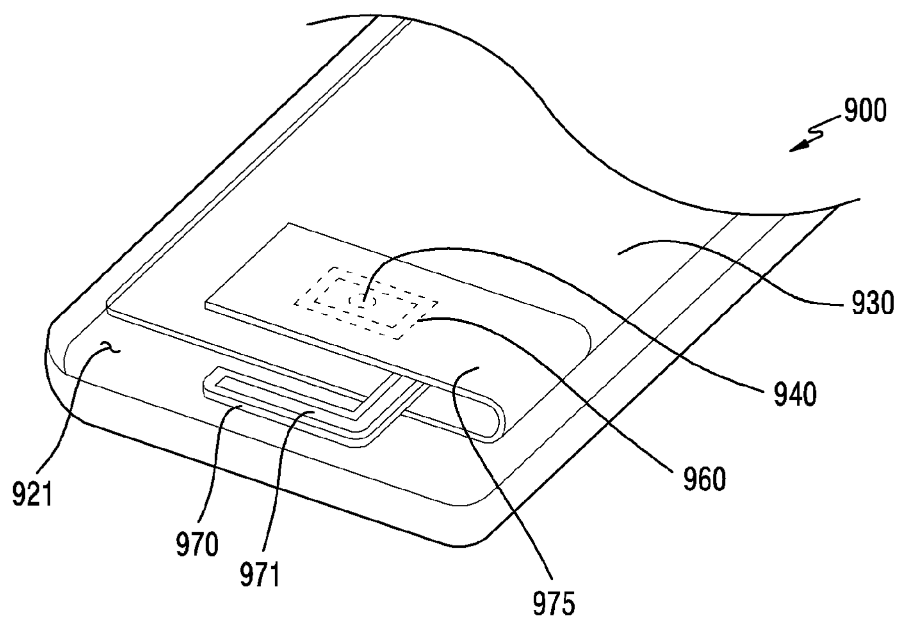
FIG. 9B is a perspective view illustrating the inside of the example electronic device of FIG. 9A according to various embodiments.

FIG. 9A is a diagram illustrating an example electronic device in which an auxiliary touch pattern is included in an opaque area located at the lower end of the electronic device according to various embodiments, and FIG. 9B is a perspective view illustrating the inside of the example electronic device of FIG. 9A.

Referring to FIGS. 9A and 9B, an electronic device 900 may include a front plate 910, a fingerprint sensor 940, a conductive pattern 960, and a first auxiliary flexible printed circuit board 970.

According to an embodiment, a display panel 930 may be stacked below the front plate 910. An opaque area 920 may be an inactive area in which no pixel of the display panel 930 exists, and the remaining area except for the opaque area 920 of the front plate 910 may be an active area that transmits information via the display panel 930. A portion of the front plate 910 may be an opaque area 920 in which the inside of the electronic device is not visible. The opaque area 920 may be formed at an edge of an active area that transmits information via the display panel 930. The opaque area 920 may be formed by printing opaque ink on the front plate 910 or by applying an opaque material to the front plate 910.

According to an embodiment, the fingerprint sensor 940 may be deactivated in the standby state of the electronic device 900, and may be activated in the state in which the processor is in the wake-up state or in the state in which the electronic device is in use. An external object approaching the fingerprint sensor 940 may be detected using the conductive pattern 960 formed around the fingerprint sensor 940. The conductive pattern 960 may be disposed only around the fingerprint sensor 940, and thus the fingerprint sensor 940 may be activated only when an external object reaches the fingerprint detection area. For example, in the case in which the electronic device 900 is in the standby state, when an external object is detected via the conductive pattern 960, the electronic device 900 may determine that the user intends to unlock the same using the fingerprint sensor 940, and may activate the fingerprint sensor 940.

According to an embodiment, in order to quickly activate the fingerprint sensor 940, the first auxiliary flexible printed circuit board 970 may include a first auxiliary conductive pattern 971. The first auxiliary conductive pattern 971 may be disposed to be biased more towards the side face of the housing than towards the fingerprint sensor 940. The first auxiliary conductive pattern 971 may be disposed on the rear face 921 of the opaque area 920 of the electronic device 900. When the user's finger approaches the fingerprint detection area from the lower side of the electronic device, the electronic device 900 may identify that the external object approaches the fingerprint detection area based on a signal relating to a change in current or voltage in the first auxiliary conductive pattern 971. The first auxiliary conductive pattern 971 may activate the fingerprint sensor 940 before the external object approaches the fingerprint sensor 940, and thus it is possible to quickly perform the authentication operation.

According to an embodiment, the first auxiliary flexible printed circuit board 970 including the first auxiliary conductive pattern 971 may be connected to a display flexible printed circuit board 975 extending from the display panel 930. The first auxiliary conductive pattern 971 may be controlled via a separate integrated circuit, and may be controlled by a touch sensor IC (e.g., the touch sensor IC 235 in FIG. 2), a fingerprint recognition sensor IC (e.g., the fingerprint recognition sensor IC 225 in FIG. 2), a display-driving IC (e.g., the display-driving IC 215 in FIG. 2) or a processor (e.g., the processor 120 in FIG. 2). The display flexible printed circuit board 975 may be connected to the fingerprint sensor 940.

According to various embodiments, the electronic device 900 may accurately determine the intention of the user based on the manner in which the user's finger approaches the first auxiliary conductive pattern 971 and the conductive pattern 960. For example, based on the time difference from detection of the user's finger in the first auxiliary conductive pattern 971 to detection of the user's finger in the conductive pattern 960, the electronic device 900 may activate the fingerprint sensor 940 when the movement time of the user's finger is shorter than a predetermined time, and the electronic device 900 may maintain the fingerprint sensor 940 in the inactive state when the movement time of the user's finger is longer than the predetermined time. According to another embodiment, when an external object is detected via the first auxiliary conductive pattern 971 but the external object is not detected via the conductive pattern 960, the electronic device 900 may be set to maintain the fingerprint sensor 940 in an inactive state, and when an external object is detected via the first auxiliary conductive pattern 971 and the conductive pattern 960, the electronic device 900 may be set to activate the fingerprint sensor 940. According to another embodiment, when an external object is not detected via the first auxiliary conductive pattern 971 and is detected only in the conductive pattern 960, the electronic device 900 may maintain the fingerprint sensor 940 in the inactive state.

Figure 10A:
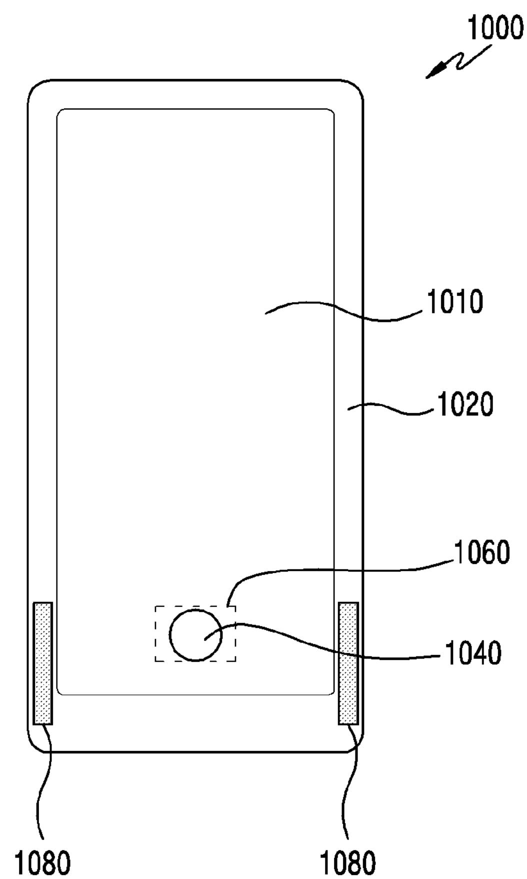
FIG. 10A is a diagram illustrating an example electronic device in which auxiliary conductive patterns are included in opaque areas located on side faces of the electronic device according to various embodiments.
Figure 10B:
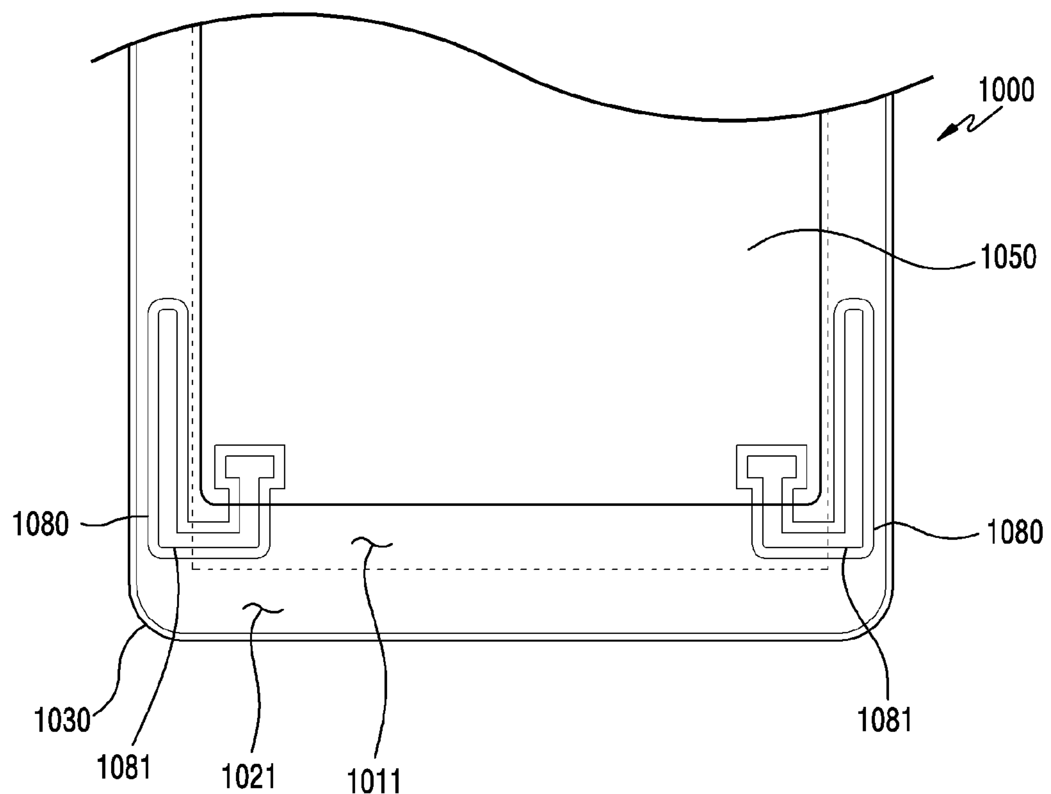
FIG. 10B is a diagram illustrating the inside of the example electronic device of FIG. 10A according to various embodiments.

FIG. 10A is a diagram illustrating an example electronic device in which auxiliary touch patterns are included in opaque areas located in side faces of the electronic device according to various embodiments, and FIG. 10B is a diagram illustrating the inside of the electronic device of FIG. 10A.

Referring to FIGS. 10A and 10B, an electronic device 1000 may include a front plate 1010, a fingerprint sensor 1040, a conductive pattern 1060, and second auxiliary flexible printed circuit boards 1080.

A portion of the front plate 1010 may be an opaque area 1020 in which the inside of the electronic device is not visible. The opaque area 1020 may be formed at an edge of an active area that transmits information via the display 1030. The opaque area 1020 may be formed by printing opaque ink on the rear face of the front plate 1010 or by applying an opaque material to the rear face of the front plate 1010.

According to an embodiment, in order to quickly activate the fingerprint sensor 1040, each of the second auxiliary flexible printed circuit boards 1080 may include a second auxiliary conductive pattern 1081. The second auxiliary conductive patterns 1081 may be disposed on opposite sides of the fingerprint sensor 1040 so as to be spaced apart from each other. The second auxiliary conductive patterns 1081 may be disposed in the opaque area 1021 of the electronic device 1000, wherein the opaque area 1021 may surround the active area 1011. The second auxiliary flexible printed circuit boards 1080 including the second auxiliary conductive patterns 1081 disposed in the opaque area 1021 may be connected to the printed circuit board 1050. When the user's finger approaches the fingerprint detection area from a lateral side of the electronic device 1000, the electronic device 1000 may identify that the external object approaches the fingerprint detection area based on a signal relating to a change in current or voltage in the second auxiliary conductive patterns 1081. The second auxiliary conductive patterns 1081 may activate the fingerprint sensor 1040 before the external object approaches the fingerprint sensor 1040, and thus it is possible to quickly perform the authentication operation.

According to an embodiment, the second auxiliary flexible printed circuit boards 1080 including the second auxiliary conductive patterns 1081 may be connected to the printed circuit board 1050. Each second auxiliary conductive pattern 1081 may be controlled via a separate integrated circuit, and may be controlled by an electronic component of the electronic device 1000, such as a touch sensor IC (e.g., the touch sensor IC 235 in FIG. 2), a fingerprint recognition sensor IC (e.g., the fingerprint recognition sensor IC 225 in FIG. 2), a display-driving IC (e.g., the display-driving IC 215 in FIG. 2) or a processor (e.g., the processor 120 in FIG. 2). The fingerprint sensor module including the fingerprint sensor 1040 may be connected to the printed circuit board.

According to various embodiments, the electronic device 1000 may accurately determine the intention of the user based on the manner in which the user's finger approaches the second auxiliary conductive patterns 1081 and the conductive pattern 1060. The fingerprint sensor 1040 may be activated by determining the user's intention based on the movement time or a detection order of an external object between the second auxiliary conductive patterns 1081 and the conductive pattern 1060.

Figure 11:
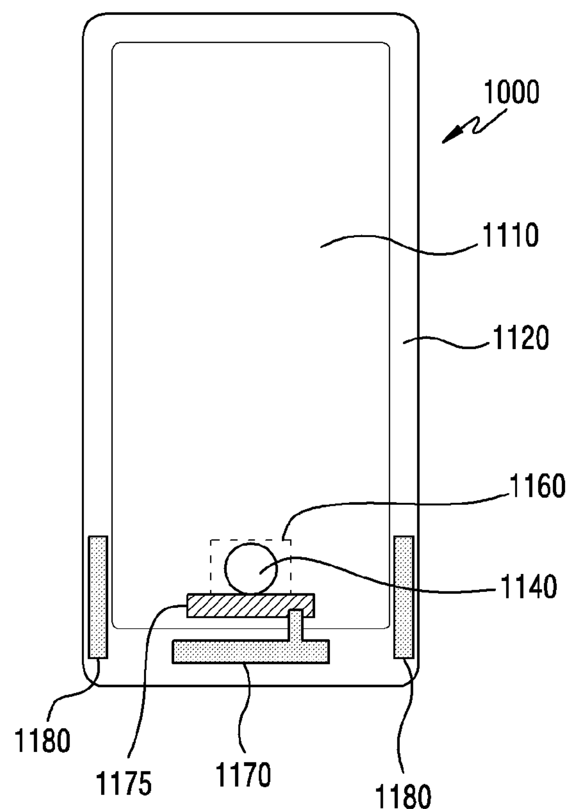
FIG. 11 is a diagram illustrating an example electronic device in which a plurality of auxiliary conductive patterns are included in opaque areas of the electronic device according to various embodiments.

FIG. 11 is a diagram illustrating an example electronic device in which a plurality of additional touch patterns are included in opaque areas of the electronic device according to various embodiments.

Referring to FIG. 11, the electronic device 1000 may include an active area 1110 and an opaque area 1120 of the front plate, a fingerprint sensor 1140, a conductive pattern 1160, a first auxiliary flexible printed circuit board 1170, and second auxiliary flexible printed circuit boards 1180. The first auxiliary flexible printed circuit board 1170 may be the same as or similar to the first auxiliary flexible printed circuit board 970 in FIGS. 9A and 9B. The second auxiliary flexible printed circuit boards 1180 may be the same as or similar to the second auxiliary flexible printed circuit boards 1080 in FIGS. 10A and 10B. Descriptions redundant with the descriptions of the first auxiliary flexible printed circuit board 1170 and the second auxiliary flexible printed circuit boards 1180 may not be repeated here.

According to various embodiments, the first auxiliary flexible printed circuit board 1170 may be disposed in an area corresponding to the opaque area 1120 formed at the lower end of the fingerprint sensor 1140 in the internal area of the electronic device 1000. According to various embodiments, the second auxiliary flexible printed circuit boards 1180 may be disposed in an area corresponding to the opaque area 1120 formed at opposite sides of the fingerprint sensor 1140 in the internal area of the electronic device 1000. The first auxiliary flexible printed circuit board 1170 may include a first auxiliary conductive pattern (e.g., the first auxiliary conductive pattern 971 in FIG. 9B), and the second auxiliary flexible printed circuit boards 1180 may include respective second auxiliary conductive patterns (e.g., the second conductive patterns 1081 in FIG. 10B). The first auxiliary flexible printed circuit board 1170 may be connected to the display flexible printed circuit board 1175, and the second auxiliary flexible printed circuit boards 1180 may be connected to the printed circuit board of the electronic device 1000.

According to various embodiments, the fingerprint sensor 1140 may be an in-display fingerprint recognition sensor disposed in the active area 1110 of the electronic device 1000, and the fingerprint sensor 1140 may be disposed in the lower side of the electronic device 1000 when viewed from the front side of the electronic device 1000. The fingerprint sensor 1140 may be disposed on the central axis parallel to the long side of the electronic device 1000. The fingerprint sensor 1140 may be activated in order to acquire biometric information, such as the user's fingerprint. When the electronic device is in a standby state or when the processor is in an inactive state, the fingerprint sensor 1140 may be in an inactive state, and may be activated when the user actually intends to use the same.

According to various embodiments, the first auxiliary flexible printed circuit board 1170 may detect the user's finger approaching from the lower side of the electronic device 1000, and the second auxiliary flexible printed circuit boards 1180 may detect the user's finger approaching from a lateral side of the lower end of the electronic device 1000. The conductive pattern 1160 may detect whether the user's finger is close to (e.g., within a specified proximity, vicinity, distance, etc. of) the fingerprint sensor 1140.

According to an embodiment, where the electronic device 1000 is in the standby state, when an external object is detected via the conductive pattern 1160, the electronic device 1000 may determine that the user intends to unlock the same using the fingerprint sensor 1140, and may activate the fingerprint sensor 1140.

According to an embodiment, in order to quickly activate the fingerprint sensor 1140, the first auxiliary flexible printed circuit board 1170 may include a first auxiliary conductive pattern (e.g., the first auxiliary conductive pattern 971 in FIG. 9B). When the user's finger approaches the fingerprint detection area from the lower side of the electronic device 1000, the electronic device 1000 may identify that the external object approaches the fingerprint detection area based on a signal relating to a change in current or voltage in the first auxiliary conductive patterns 971 included in the first auxiliary flexible printed circuit board 1170. The first auxiliary flexible printed circuit board 1170 including the first auxiliary conductive pattern 971 may activate the fingerprint sensor 1140 before the external object approaches the fingerprint sensor 1140, making it possible to quickly perform the authentication operation.

According to an embodiment, the first auxiliary flexible printed circuit board 1170 including the first auxiliary conductive pattern 971 may be connected to the display flexible printed circuit board 1175. The first auxiliary conductive pattern 971 may be controlled via a separate integrated circuit, and may be controlled by a touch sensor IC (e.g., the touch sensor IC 235 in FIG. 2), a fingerprint recognition sensor IC (e.g., the fingerprint recognition sensor IC 225 in FIG. 2), a display-driving IC (e.g., the display-driving IC 215 in FIG. 2), or a processor (e.g., the processor 120 in FIG. 2).

According to various embodiments, the first auxiliary flexible printed circuit board 1170 may detect an external object approaching from the lower side of the electronic device 1000, and the second auxiliary flexible printed circuit boards 1180 may detect the user's finger approaching from a lateral side of the fingerprint sensor 1140.

According to various embodiments, the electronic device 1000 may accurately determine the intention of the user based on the manner in which the user's finger approaches the first auxiliary conductive pattern included in the first auxiliary flexible printed circuit board 1170 and the conductive pattern 1160. For example, based on the time difference from detection of an external object by the first auxiliary conductive pattern included in the first auxiliary flexible printed circuit board 1170 to detection of the external object by the conductive pattern 1160, the electronic device 1000 may activate the fingerprint sensor 1140 when the movement time of the external object to the conductive pattern 1160 is shorter than a predetermined time, and the electronic device 1000 may maintain the fingerprint sensor 1140 in the inactive state when the movement time of the external object to the conductive pattern 1160 is longer than the predetermined time. According to another embodiment, when an external object has been detected via the first auxiliary conductive pattern but the external object is not detected via the conductive pattern 1160, the electronic device 1000 may maintain the fingerprint sensor 1140 in the inactive state. When an external object is detected via the first auxiliary conductive pattern and the conductive pattern 1160, the electronic device 1000 may maintain the fingerprint sensor 1140 in the active state. According to still another embodiment, when an external object is not detected via the first auxiliary conductive pattern and is detected only in the conductive pattern 1160, the electronic device 1000 may maintain the fingerprint sensor 1140 in the inactive state.

According to various embodiments, the electronic device 1000 may accurately determine the intention of the user based on the manner in which the user's finger approaches the second auxiliary conductive patterns included in the second auxiliary flexible printed circuit boards 1180 and the conductive pattern 1160. For example, based on the time difference from detection of an external object by the second auxiliary conductive patterns included in the second auxiliary flexible printed circuit boards 1180 to detection of the external object in the conductive pattern 1160, the electronic device 1000 may maintain the fingerprint sensor 1140 in the inactive state when the movement time of the external object to the conductive pattern 1160 is longer than a predetermined time.

According to another embodiment, when an external object, moving to the fingerprint sensor 1140 from a lateral side of the electronic device 1000, is detected via the second auxiliary conductive pattern included in the second auxiliary flexible printed circuit boards 1180 but the external object is not detected via the conductive pattern 1160, the electronic device 1000 may maintain the fingerprint sensor 1140 in the inactive state. When an external object is detected via the second auxiliary conductive patterns and the conductive pattern 1160, the electronic device 1000 may be set to activate the fingerprint sensor 1140. According to still another embodiment, when an external object is not detected via the second auxiliary conductive pattern included in the second auxiliary flexible printed circuit boards 1180 and is detected only in the conductive pattern 1160, the electronic device 1000 may maintain the fingerprint sensor 1140 in the inactive state.

According to various embodiments, using the conductive pattern 1160, the first auxiliary flexible printed circuit board 1170, and the second auxiliary flexible printed circuit boards 1180, the electronic device 1000 may cause the fingerprint sensor 1140 to detect an external object and may quickly activate the fingerprint sensor 1140 so as to perform an authentication operation. According to various embodiments, when an external object is detected by at least one of the first auxiliary conductive pattern included in the first auxiliary flexible printed circuit board 1170 or the first auxiliary conductive pattern included in the second auxiliary flexible printed circuit boards while the external object approaches the conductive pattern 1160, the fingerprint sensor 1140 may be activated.

Figure 12:
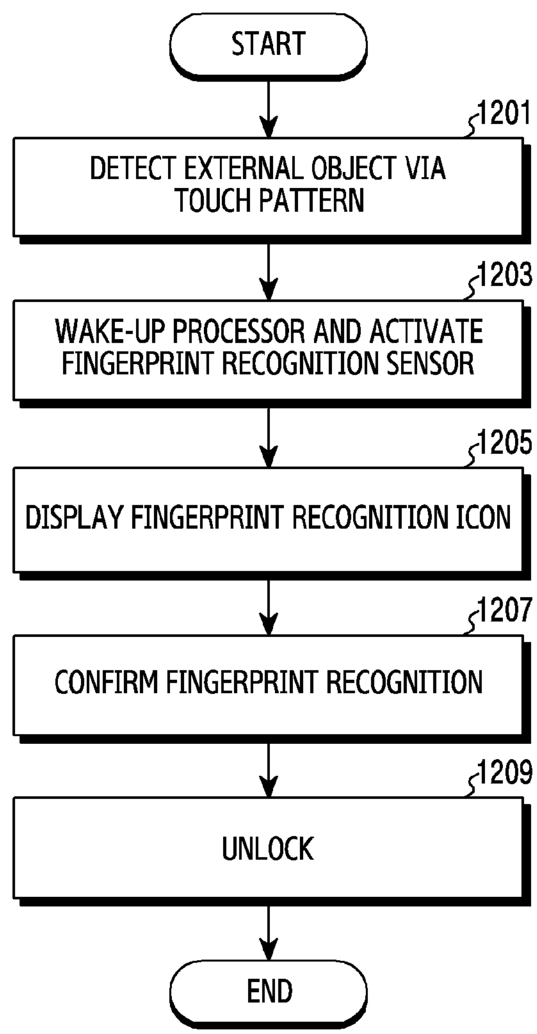
FIG. 12 is a flowchart illustrating an example biometric authentication process of an electronic device according to various embodiments.
Figure 13:
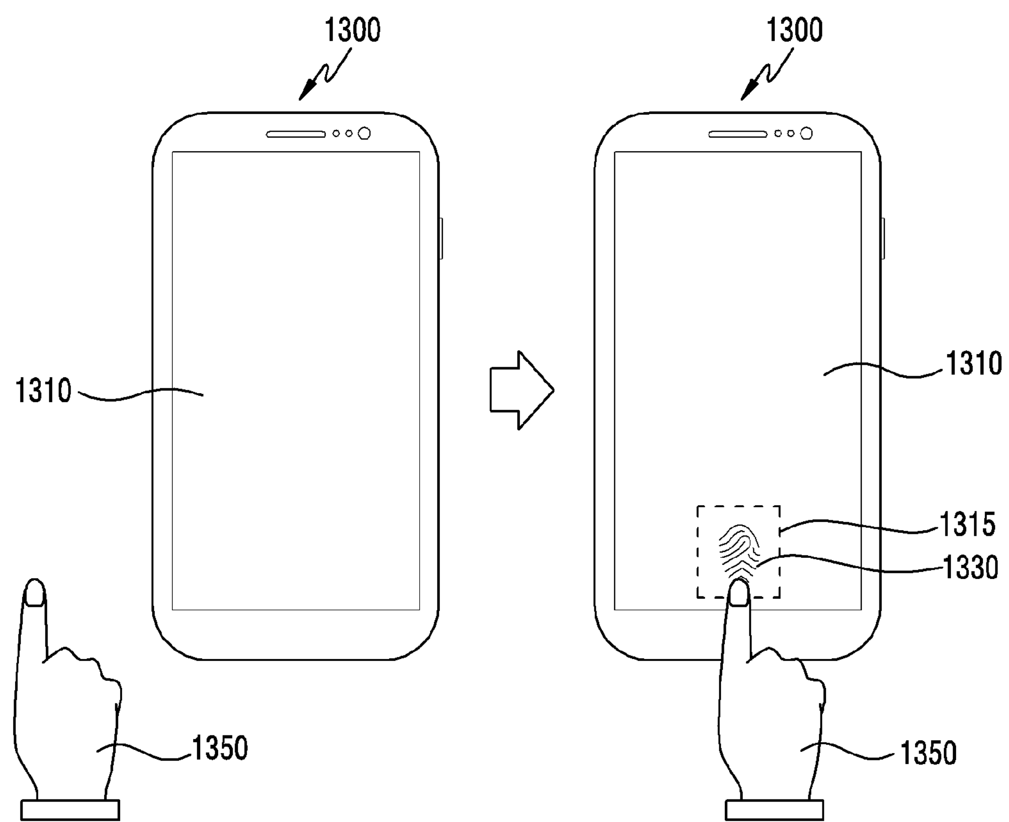
FIG. 13 is a diagram illustrating an example operation of an electronic device according to various embodiments.

FIG. 12 is a flowchart illustrating an example biometric authentication process of an electronic device according to various embodiments, and FIG. 13 is a diagram illustrating an example operation of an electronic device according to various embodiments.

Referring to FIGS. 12 and 13, in operation 1201, an external object 1350 (e.g., a user's finger) may be detected via a touch pattern (e.g., the touch sensor 230 in FIG. 2, the conductive pattern 535 in FIG. 5, the first auxiliary conductive pattern 971 in FIG. 9B, and the second auxiliary conductive patterns 1081 in FIG. 10B). When an external object 1350 moves to the fingerprint detection area 1315 included in the electronic device 1300, the external object 1350 may be detected using a voltage or a current that changes in the touch pattern. When the touch pattern detects an external object, the touch sensor IC (e.g., the touch sensor IC 235 in FIG. 2) may transmit a sensing signal to the processor (e.g., the processor 120 in FIG. 1).

According to an embodiment, in operation 1203, the processor (e.g., the processor 120 in FIG. 1) may be woken up based on the sensing signal, and the fingerprint recognition sensor (e.g., the fingerprint recognition sensor 220 of FIG. 2 and the fingerprint sensor 430 of FIG. 4) may be activated. When the touch pattern detects the external object 1350 while the fingerprint recognition sensor and the processor are in the inactive state or the standby state, the fingerprint recognition sensor and the processor are activated if the fingerprint sensor is necessary in the authentication operation, thereby reducing the amount of power consumed by the electronic device 1300.

According to an embodiment, in operation 1205, when the fingerprint sensor is activated, a fingerprint recognition icon 1330 may be displayed on a display 1310. The fingerprint recognition icon 1330 may be stored in memory (e.g., the memory 130 in FIG. 1), a touch sensor IC (e.g., the touch sensor IC 235 in FIG. 2), or a display-driving IC (e.g., the display-driving IC 215 in FIG. 2), and when the external object 1350 is detected via the touch pattern, the stored fingerprint recognition icon 1330 may be displayed on the display 1310. According to various embodiments, operation 1205 may be performed simultaneously with operation 1203, and the fingerprint recognition icon 1330 may be displayed on the display 1310 prior to operation 1203, depending on whether the external object 1350 is detected.

According to an embodiment, in operation 1207, the external object 1350 may move onto the fingerprint recognition icon 1330, and the fingerprint may be confirmed in the state in which the external object 1350 is spaced apart from the display 1310. When the fingerprint recognition icon 1330 is touched on the front plate (the front plate 310 in FIG. 4) on the display 1310, it is possible to confirm the fingerprint.

According to various embodiments, in the case in which the fingerprint is spaced apart from the display 1310, on which the fingerprint recognition icon 1330 is displayed, and is confirmed, the electronic device may perform an unlocking operation 1209 when the user touches the fingerprint recognition icon 1330. When the fingerprint is confirmed by touching the fingerprint recognition icon 1330, the electronic device may perform the unlocking operation simultaneously with confirming the fingerprint.

According to various embodiments, the electronic device 1300 may detect, via the conductive pattern, whether the external object 1350 is approaching in the state in which the display 1310 is turned off. When the external object 1350 is detected, the electronic device 1300 may display the fingerprint recognition icon 1330 on the display 1310 and may activate the fingerprint sensor to perform the authentication operation. Via the conductive pattern, the electronic device 1300 may shorten the authentication operation time by quickly activating the fingerprint sensor when the user intends to use the fingerprint sensor, and reduce power consumption by deactivating the fingerprint sensor in the standby state.

An electronic device (e.g., the electronic device 101 in FIG. 1) according to various example embodiments may include: a housing (e.g., the housing 320 in FIG. 3) including a front face and a rear face opposite the front face; a transparent plate (e.g., the front plate 310 in FIG. 3) defining the front face of the housing; a display panel (e.g., the display panel 410 in FIG. 4) disposed below the transparent plate; a fingerprint sensor (e.g., the fingerprint sensor 430 in FIG. 4 or the fingerprint sensor 531 in FIG. 5) disposed between the display panel and the rear face of the housing and configured to acquire biometric information about an external object within a specified proximity of the transparent plate; and a conductive pattern (e.g., the conductive pattern 535 in FIG. 5) comprising a conductive material disposed adjacent to the fingerprint sensor and configured to detect whether the external object is within the specified proximity of the fingerprint sensor.

According to various example embodiments, the electronic device may further include a flexible printed circuit board (e.g., the flexible printed circuit board 533 in FIG. 5, the flexible printed circuit board 780 in FIG. 7, or the flexible printed circuit board 880 in FIG. 8) on which the fingerprint sensor and the conductive pattern are disposed.

According to various example embodiments, the conductive pattern may be provided on a surface of the flexible printed circuit board, or may be provided inside the flexible printed circuit board.

According to various example embodiments, the conductive pattern may be disposed along an edge of the fingerprint sensor to surround at least a portion of the fingerprint sensor.

According to various example embodiments, the conductive pattern may include a band shape corresponding to an edge of the fingerprint sensor.

According to various example embodiments, at least a portion of the conductive pattern may be spaced apart from the fingerprint sensor.

According to various example embodiments, the display panel may have a rectangular shape, and a central axis parallel to a long edge of the display panel and a center of the fingerprint sensor may substantially coincide with each other.

According to various example embodiments, distances from the fingerprint sensor to two short edges of the display panel may be different from each other.

According to various example embodiments, the transparent plate may include an active area configured to transmit light emitted from the display panel, and an opaque area (e.g., the opaque area 920 in FIG. 9A) disposed along an edge of the active area, and the electronic device may further include at least one auxiliary flexible printed circuit board (e.g., the first auxiliary flexible printed circuit board 970 in FIG. 9B or the second auxiliary flexible printed circuit boards 1080 in FIG. 10A) disposed in an area adjacent to the fingerprint sensor and including a touch pattern.

According to various example embodiments, the opaque region may include a first area having a first length, a second area disposed parallel to the first area, a third area extending from one end of the first area to one end of the second area and having a second length, and a fourth area substantially parallel to the third area and extending from a second end of the first area to the second end of the second area, and the first auxiliary flexible printed circuit board (e.g., the first auxiliary flexible printed circuit board 970 in FIG. 9B) is disposed in the second area adjacent to the fingerprint recognition sensor.

According to various example embodiments, the electronic device may further include a second auxiliary flexible printed circuit board (e.g., the second auxiliary flexible printed circuit board 1080 in FIG. 10B) and a third auxiliary flexible printed circuit board (e.g., the second auxiliary flexible printed circuit board 1080 in FIG. 10B), each of which is disposed in one of the third area and the fourth area adjacent to the fingerprint sensor.

According to various example embodiments, the electronic device may further include a processor (e.g., the processor 120 in FIG. 1) electrically connected to the conductive pattern, the fingerprint sensor, and the display panel, wherein the conductive pattern is configured to detect whether the external object (e.g., the external object 750 in FIG. 7) is within a specified proximity of the fingerprint sensor, and the display panel is configured to activate the fingerprint sensor, the processor, and a fingerprint recognition icon (e.g., the fingerprint recognition icon 1330 in FIG. 13) based on detecting whether the external object is within the specified proximity of the fingerprint sensor.

According to various example embodiments, the fingerprint recognition icon may be displayed at a position corresponding to the fingerprint sensor.

According to various example embodiments, the fingerprint sensor may be at least one of an optical fingerprint sensor, a capacitive fingerprint sensor, or an ultrasonic fingerprint sensor.

According to various example embodiments, the fingerprint sensor may be in contact with the display panel.

According to various example embodiments, an electronic device (e.g., the electronic device 101 in FIG. 1) may include: a housing (e.g., the housing 320 in FIG. 3) including a front face and a rear face opposite the front face; a transparent plate (e.g., the front plate 310 in FIG. 3) having a first face defining the front face of the housing; a display panel (e.g., the display panel 410 in FIG. 4) including a touch panel (e.g., the TSP 240 in FIG. 2) and a plurality of pixels configured to emit light towards the transparent plate, the display panel having a first face in contact with a second face of the transparent plate; a fingerprint sensor (e.g., the fingerprint sensor 430 in FIG. 4 or the fingerprint sensor 531 in FIG. 5) in contact with a second face of the display panel and configured to acquire biometric information about an external object within a specified proximity of the transparent plate; a flexible printed circuit board (e.g., the flexible printed circuit board 533 in FIG. 5, the flexible printed circuit board 780 in FIG. 7, or the flexible printed circuit board 880 in FIG. 8) on which the fingerprint sensor is disposed; and a conductive pattern (e.g., the conductive pattern 535 in FIG. 5) comprising a conductive material disposed on the flexible printed circuit board surrounding at least a part of the fingerprint sensor and configured to detect whether the external object is within a specified proximity of the fingerprint sensor.

According to various example embodiments, a fingerprint recognition icon (e.g., the fingerprint recognition icon 1330 in FIG. 13) may be displayed on the display panel at a position corresponding to the fingerprint recognition sensor when the external object (e.g., the external object 750 in FIG. 7) approaches an area in which the conductive pattern is located.

According to various example embodiments, the electronic device may further include a processor (e.g., the processor 120 in FIG. 1) electrically connected to the fingerprint sensor, the conductive pattern, and the display panel, and based on the fingerprint recognition icon being activated, the processor may be activated.

According to various example embodiments, the external object may be a finger of a user, and the processor may be configured to control the electronic device to: recognize the fingerprint of the user using the fingerprint sensor, determine whether the user is an authorized user based on the fingerprint of the user, and unlock the electronic device based on the determination.

According to various example embodiments, the electronic device may further include: at least one auxiliary flexible printed circuit board (e.g., the first auxiliary flexible printed circuit board 970 in FIG. 9B or the second auxiliary flexible printed circuit boards 1080 in FIG. 10A) including an auxiliary conductive pattern (e.g., the first auxiliary conductive pattern 971 in FIG. 9B or the second auxiliary conductive patterns 1081 in FIG. 10A) configured to determine whether the external object is within a specified proximity of the fingerprint sensor. The transparent plate may include an active area configured to transmit light emitted by the pixels, and an opaque area provided along an edge of the active area, and the at least one auxiliary flexible printed circuit board may be disposed in an area corresponding to the opaque region on the second face of the transparent plate.

Methods according to various example embodiments described in the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the memories may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described example embodiments of the disclosure, a component included in the disclosure is expressed in the singular or the plural according to a presented example embodiment. However, the singular form or plural form is selected for convenience of description suitable for the presented situation, and various example embodiments of the disclosure are not limited to a single element or multiple elements thereof. Further, either multiple elements expressed in the description may be configured into a single element or a single element in the description may be configured into multiple elements.

While the disclosure has been illustrated and described with reference to various example embodiments thereof, it will be understood by those skilled in the art that various changes in form and details may be made therein without departing from the scope of the disclosure. Therefore, the scope of the disclosure should not be defined as being limited to the embodiments, and includes at least the scope defined by the appended claims and equivalents thereof.

What is claimed is:

1. An electronic device comprising:

a housing including a front face and a rear face opposite the front face;

a transparent plate defining the front face of the housing;

a display panel disposed below the transparent plate;

a fingerprint sensor disposed between the display panel and the rear face of the housing and configured to acquire biometric information about an external object that is within a specified proximity of the transparent plate;

a conductive pattern comprising a conductive material disposed adjacent to the fingerprint sensor and configured to detect whether the external object is within a specified proximity of the fingerprint sensor;

a flexible printed circuit board on which the fingerprint sensor and the conductive pattern are disposed; and at least one auxiliary flexible printed circuit board disposed in an area adjacent to the fingerprint sensor and including a touch pattern.

2. The electronic device of claim 1, wherein the conductive pattern is disposed on a surface of the flexible printed circuit board or is provided inside the flexible printed circuit board.

3. The electronic device of claim 1, wherein the conductive pattern is disposed along an edge of the fingerprint sensor to surround at least a portion of the fingerprint sensor.

4. The electronic device of claim 3, wherein the conductive pattern has a band shape corresponding to the edge of the fingerprint sensor.

5. The electronic device of claim 4, wherein at least a portion of the conductive pattern is spaced apart from the fingerprint sensor.

6. The electronic device of claim 1, wherein the display panel has a rectangular shape, and a central axis parallel to a long edge of the display panel and a center of the fingerprint sensor coincide with each other.

7. The electronic device of claim 6, wherein a distance from the fingerprint sensor to a first short edge of the display panel and a distance from the fingerprint sensor to a second short edge of the display panel are different from each other.

8. The electronic device of claim 1, wherein the transparent plate includes an active area configured to transmit light emitted from the display panel, and an opaque area disposed along an edge of the active area.

9. The electronic device of claim 1, wherein the opaque area includes a first area having a first length, a second area disposed parallel to the first area, a third area extending from one end of the first area to one end of the second area and having a second length, and a fourth area parallel to the third area and extending from another end of the first area to another end of the second area, and a first auxiliary flexible printed circuit board is disposed in the second area adjacent to the fingerprint sensor.

10. The electronic device of claim 9, further comprising:

a second auxiliary flexible printed circuit board disposed in one of the third area and the fourth area adjacent to the fingerprint sensor and a third auxiliary flexible printed circuit board disposed in another one of the third area and the fourth area adjacent to the fingerprint sensor.

11. The electronic device of claim 1, further comprising:

a processor electrically connected to the conductive pattern, the fingerprint sensor, and the display panel, wherein the display panel is configured to activate the fingerprint sensor, the processor, and a fingerprint recognition icon based on the detecting of the external object.

12. The electronic device of claim 11, wherein the fingerprint recognition icon is configured to be displayed at a position corresponding to the fingerprint sensor.

13. The electronic device of claim 1, wherein the fingerprint sensor includes at least one of an optical fingerprint sensor, a capacitive fingerprint sensor, or an ultrasonic fingerprint sensor.

14. The electronic device of claim 1, wherein the fingerprint sensor is in contact with the display panel.

15. An electronic device comprising:

a housing including a front face and a rear face opposite the front face;

a transparent plate having a first face defining the front face of the housing;

a display panel including a plurality of pixels configured to emit light towards the transparent plate, the display panel having a first face in contact with a second face of the transparent plate;

a fingerprint sensor in contact with a second face of the display panel and configured to acquire biometric information about an external object within a specified proximity of the transparent plate;

a flexible printed circuit board on which the fingerprint sensor is disposed;

a conductive pattern comprising a conductive material disposed on the flexible printed circuit board surrounding at least a portion of the fingerprint sensor and configured to detect whether the external object is within a specified proximity of the fingerprint sensor; and at least one auxiliary flexible printed circuit board including an auxiliary conductive pattern configured to determine whether the external object is within a specified proximity of the fingerprint sensor.

16. The electronic device of claim 15, wherein the electronic device is configured to display a fingerprint recognition icon on the display panel at a position corresponding to the fingerprint sensor based on the external object being within a specified proximity of an area in which the conductive pattern is located.

17. The electronic device of claim 16, further comprising:

a processor electrically connected to the fingerprint sensor, the conductive pattern, and the display panel, wherein, the processor is configured to be activated based on the fingerprint recognition icon being activated.

18. The electronic device of claim 17, wherein the external object includes a finger of a user, and the processor is configured to: recognize a fingerprint of the user using the fingerprint sensor, determine whether the user is an authorized user based on the fingerprint of the user, and unlock the electronic device based on the determination.

19. The electronic device of claim 15, wherein the transparent plate includes an active area configured to transmit light emitted by the pixels, and an opaque area disposed along an edge of the active area, and the at least one auxiliary flexible printed circuit board is disposed in an area corresponding to the opaque region on the second face of the transparent plate.

* * * * *